Feb. 11, 1969  P. G. TOSI  3,426,617
CHANGE-SPEED MECHANISM FOR AN AUTOMOBILE VEHICLE
Filed Nov. 23, 1966  Sheet 1 of 3

INVENTOR:
Pierre Guy Tosi
by: J. Delattre-Seguy
Attorney

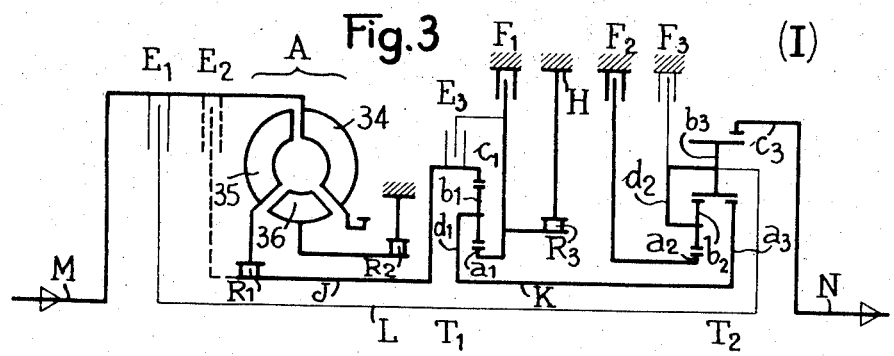
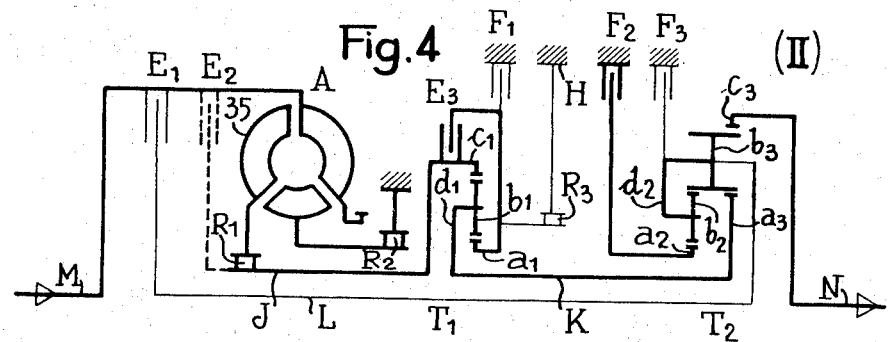
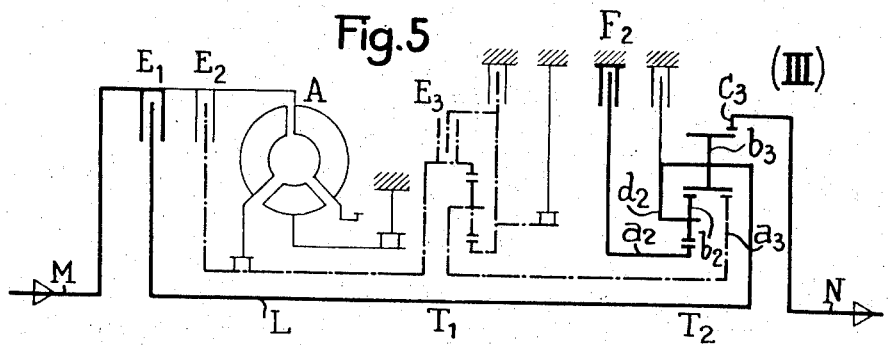
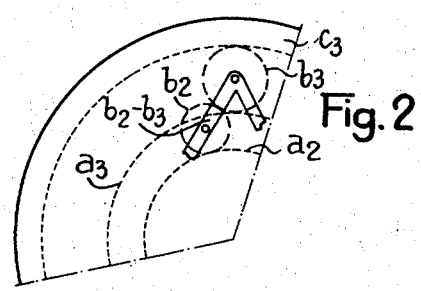

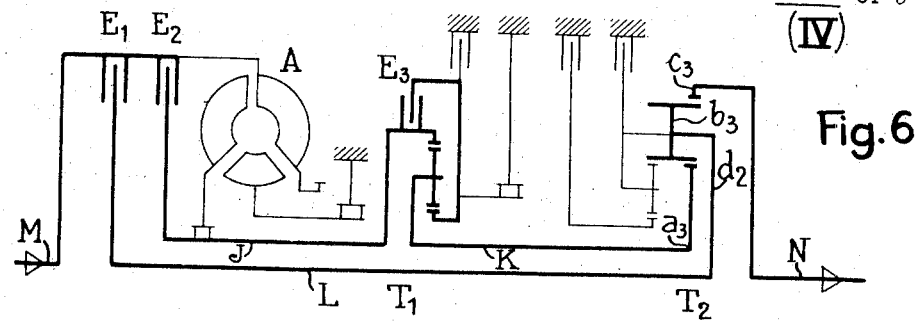
Fig. 6 (IV)
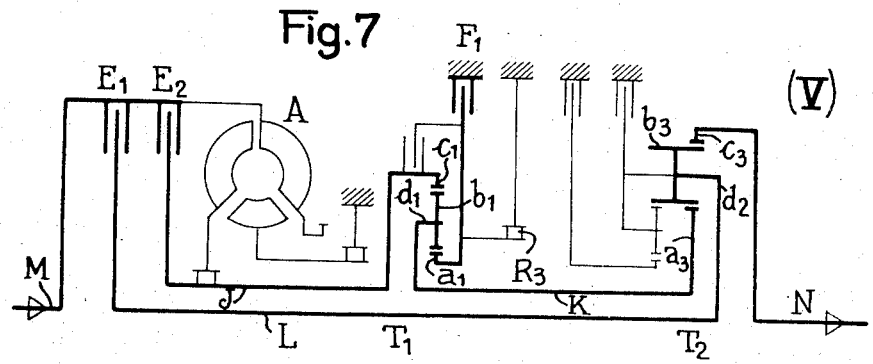
Fig. 7 (V)
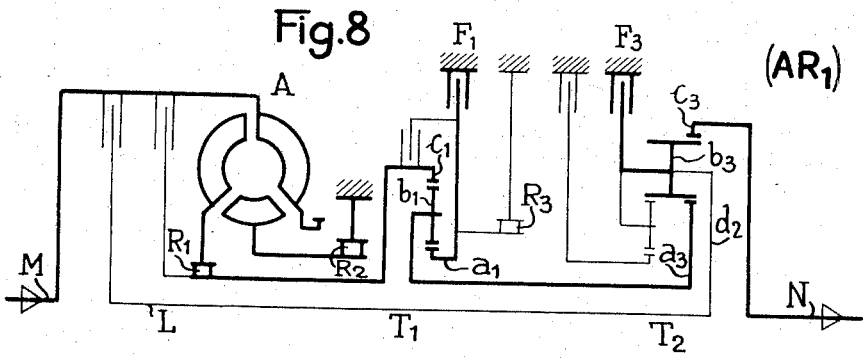
Fig. 8 (AR₁)
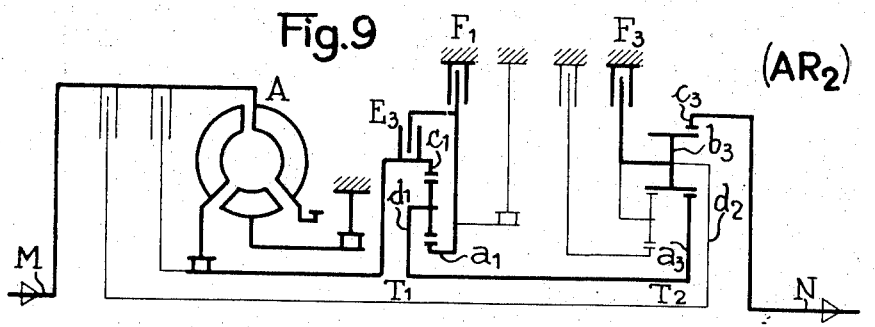
Fig. 9 (AR₂)
INVENTOR:
Pierre Guy TOSI
by J. Delattre-Seguy
Attorney United States Patent Office 3,426,617
Patented Feb. 11, 1969

3,426,617
CHANGE-SPEED MECHANISM FOR AN AUTOMOBILE VEHICLE
Pierre Guy Tosi, Sens, France, assignor to Centre de Recherches de Pont-a-Mousson, Pont-a-Mousson, France, a French body corporate
Filed Nov. 23, 1966, Ser. No. 596,616
Claims priority, application France, Nov. 29, 1965, 40,073/65
U.S. Cl. 74—688    5 Claims
Int. Cl. F16h 47/08, 57/10

ABSTRACT OF THE DISCLOSURE

Change-speed mechanism comprising a torque converter and a double epicyclic train having an upstream and a downstream sun gear and a single ring gear connected to the output shaft of the mechanism. The turbine of the converter is connected in a single direction of rotation to the downstream sun gear by a first and a second hollow shaft rotatable on an intermediate shaft, a free wheel connecting the first hollow shaft to the turbine, the second hollow shaft being connected to rotate with the downstream sun gear. At least one single epicyclic train interconnects the hollow shafts. Brakes and clutches are combined with the epicyclic trains and torque converter.

---

The present invention relates to change-speed mechanisms of the type having a hydraulic torque converter combined with epicyclic gear trains which are combined with clutches and brakes for affording a number of forward speeds and at least one reverse speed.

The object of the invention is to provide a mechanism of this type which is so improved as to have a minium overall size while affording the maximum number of transmission ratios. This mechanism is also so improved as to ensure high operational reliability and an improvement in the comfort of the passengers of the vehicle owing to elimination of jerking heretofore experienced when changing the transmission ratios or speeds.

The mechanism according to the invention comprises at least one epicyclic gear train, a hydraulic torque converter, a double epicyclic gear train, namely a gear train having two sets of planet gears and two centre sun gears one of which is an upstream gear and the other a downstream gear, the turbine of said torque converter being operatively connected to said downstream sun gear of said double epicyclic gear train through a free wheel.

In respect of the second speed, this free wheel precludes the emptying of the converter which, without the free wheel, would disadvantageously act as a hydraulic brake.

Further features and advantages of the invention will be apparent from the ensuing description with reference to the accompanying drawing.

In the drawings:

FIG. 2 is a partial and diagrammatic cross-sectional view, taken along the broken line 2—2 of FIG. 1, namely through the double epicyclic gear train;

FIGS. 3–9 are diagrams or symbolic representations of this change-speed mechanism respectively in the position of the first speed (I), second speed (II), third speed (III), fourth speed (IV) and fifth speed (V), the slow reverse speed (AR$_1$) and rapid reverse speed (AR$_2$).

Figure 1:
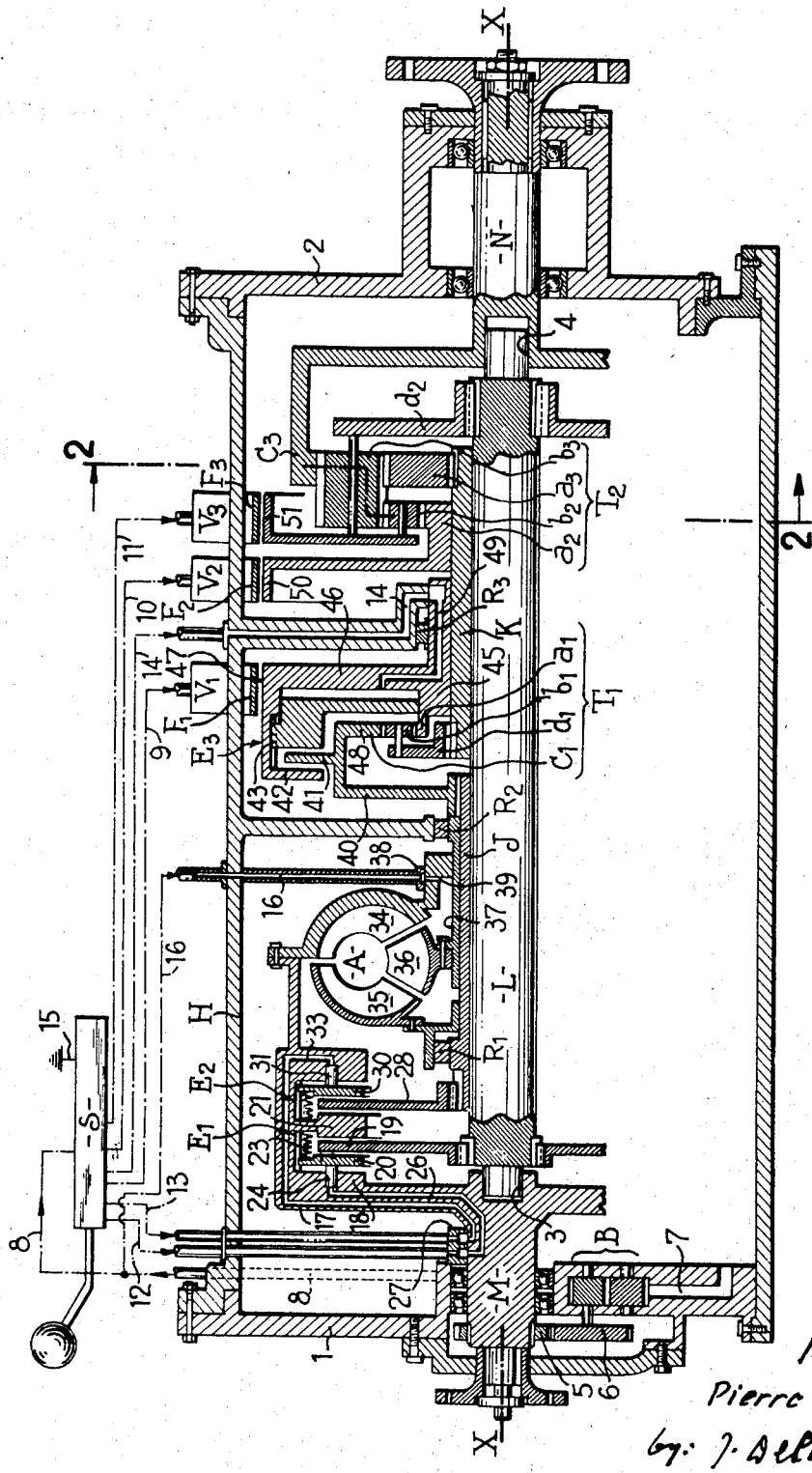
FIG. 1 is a diagrammatic longitudinal sectional view of a change-speed mechanism according to the invention.

In the various figures, capital letters designate the transmission shafts and main devices of the mechanism, such as the torque converter, the clutches, the brakes, and the epicyclic gear trains. Small letters designate the elements of the epicyclic gear trains and the numbers designate the various other elements of the mechanism. In the diagrams, active or operative elements are shown in heavy full line, the inoperative or inactive elements in thin full line; the elements optionally operative in dotted line, and the elements which are ready to come into action but subjected to no force in heavy dot-dash line.

Further, "upstream" indicates the parts located adjacent the input shaft of the gear box (on the left side of the figures) and "downstream" the elements located adjacent the output shaft (on the right side of the figures).

According to the illustrated embodiment, the change-speed mechanism or gear box according to the invention is adapted to connect an input shaft or driven shaft M to an output shaft or driving shaft N both of which have an axis X—X. An intermediate shaft L having the same axis X—X is located between the shafts M and N. This intermediate shaft carries two hollow shafts J and K which have the same axis X—X and are capable of rotating at speeds different from the intermediate shaft.

The mechanism is located in a case H. The shafts M and N are journalled by ball bearings respectively in the forward cover 1 and rear cover 2 of this case. The upstream end of the intermediate shaft L is journalled at 3 inside the driving shaft M whereas its downstream end is journalled at 4 inside the driven shaft N.

The shafts M, N, L, J and K are operatively interconnected by the combination of a hydraulic torque converter A, epicyclic gear trains T$_1$ and T$_2$, free wheels R$_1$, R$_2$, R$_3$, and clutches E$_1$, E$_2$ and E$_3$. In particular, brakes F$_1$, F$_2$ and F$_3$, actuated by hydraulic jacks V$_1$, V$_2$ and V$_3$, are combined with the epicyclic gear trains.

These jacks and the hydraulic converter A are fed with oil under pressure by a gear pump B which is driven in rotation by the driving shaft M for example through gears 5 and 6. This pump draws oil from the case H of the gear box by way of a conduit 7 and pumps it through a conduit 8 to a speed selector S which is for example a manual selector which distributes the oil by way of conduits 9, 10 and 11 to the jacks V$_1$, V$_2$ and V$_3$ and by way of conduits 12, 13 and 14 to the clutches E$_1$, E$_2$ and E$_3$.

These various conduits can also be connected by the selector S to a discharge conduit 15.

The torque converter A is fed directly through a conduit 16 which is connected to the conduit 8.

The first clutch E$_1$ is mounted between the driving shaft M and the intermediate shaft L. This clutch E$_1$ is of the disc type and mounted inside a casing 17 and comprises a primary plate 18 which is rigid with the end of the driving shaft M and with the casing 17, a secondary plate 19 which is rigid, as concerns rotation, with the intermediate shaft L, and, for example, two discs 20, 21 which are connected to rotate together. Disc 21 integral with plate 18 and disc 20 being connected to disc 21, for example by the grooves of the plate 18, are adapted to be applied against the plate 19 for the purpose of coupling the shafts M and L, plate 19 moving slightly axially for this purpose. The elements of the clutch E$_1$ are urged together or engaged, in opposition to the action of springs 23, by piston jacks 24 which are fed with oil under pressure through a passage 26 which communicates with an annular recess in a fixed ring 27. The supply conduit 12 of the clutch E$_1$ also communicates with said recess.

Mounted between the driving shaft M and the hollow shaft J is the second clutch E$_2$ which is adapted to interconnect the shafts M and J in by-passing the torque converter A.

This clutch E$_2$ is of the disc type similar to the clutch E$_1$ and also mounted inside the casing 17. It comprises the same primary plate casing 17 as the clutch E$_1$, a secondary plate 28, constituting a disc slidably keyed on the sleeve J and a movable plate 30 which is connected to rotate with the plate-casing 17. This clutch is engaged in opposition to the action of springs by piston jacks 31 fed with oil under pressure through a passage 33 which is connected to the conduit 13 through the fixed ring 27.

The hydraulic torque converter A is mounted on the downstream side of the clutches $E_1$ and $E_2$ and comprises in the known manner, a pump, a turbine, and a reactor.

The pump or impeller 34 has a rotor fixed to the casing 17 of the clutches $E_1$ and $E_2$ and is connected to rotate with the primary plate 18 of the clutch $E_1$ and therefore with the driving shaft M. This pump 34 rotates the coaxial turbine 35 which is mounted on the sleeve J by means of the free wheel $R_1$. This free wheel $R_1$ allows the turbine 35 to rotate freely without being operative when the clutch $E_2$ is engaged. Thus, the converter A, although remaining filled with oil under pressure, offers no resistance to the direct coupling of the shafts M and J.

The reactor 36 is carried by a sleeve 37, rotatably mounted on the sleeve J, and bears against the case of the gear box through the free wheel $R_2$ in the known manner.

The hydraulic converter A is fed with oil under pressure through the conduit 16 which is directly connected to the discharge conduit 8 of the pump B. The conduit 16 communicates with an annular recess in a fixed ring 38. Also communicating with the latter is a conduit 39 which extends through the hub of the pump 34 of the converter A.

Mounted on the downstream side of the converter A are epicyclic gear trains $T_1$ and $T_2$, their brake bands $F_1$, $F_2$ and $F_3$ and the corresponding actuating jacks $V_1$, $V_2$ and $V_3$ and a clutch $E_3$ adapted to lock into a single rotative unit the various elements of the speed reducing train $T_1$.

The speed-reducing train $T_1$ comprises a centre sun gear $a_1$, planet gears $b_1$ and a ring gear $c_1$ constituting an outer sun gear. The planet gears are freely rotative on a planet gear carrier $d_1$. The ring gear $c_1$ is carried by a plate 40 which is connected to rotate with the sleeve or hollow shaft J on which it is keyed. This plate 40 carries on its periphery a disc 41 which is a part of the clutch $E_3$ and interposed between two other discs 42 and 43 at least one of which, namely disc 43, is axially slidable by means for engaging the clutch $E_3$ which will be mentioned hereinafter.

The planet gear carrier $d_1$ is keyed on the sleeve K carried by the intermediate shaft L. the centre gear $a_1$ is carried by a hub 45 which is freely rotative on the sleeve K. This hub carries a plate 46 and the brake ring 47 of the brake $F_1$. The brake band $F_1$ is capable of tightening around or gripping the brake ring 47 under the effect of the jack $V_1$. The ring 47 encompasses the ring $c_1$ and disc 41 and carries the disc 43 of the clutch $E_3$. The plate 46 is machined internally in such manner as to have an annular cavity which has an axis X—X and in which is slidable an annular piston 48. The latter is connected to rotate with the movable disc 43 of the clutch $E_3$, this disc being slidably keyed in the ring 47. The piston 48 is actuated by oil under pressure supplied through a conduit 49 which extends through the plate 46 and the hub 45 and communicates with an annular recess with which the conduit 14 also communicates. When the clutch $E_3$ is engaged, the centre sun gear $a_1$ and the ring gear $c_1$ are interconnected to rotate together and consequently the gear train $T_1$ operates as a unit or block which rotates at a given speed.

The centre sun gear $a_1$ of the train $T_1$ can bear against the case of the gear box through the free wheel $R_3$ which is mounted between the case and the hub 45 of this gear $a_1$. The free wheel $R_3$ holds the gear $a_1$ stationary in one direction, when the brake $F_1$ is not applied, and acts as a support therefor. On the other hand, it allows the gear $a_1$ to rotate freely in the other direction.

This free wheel $R_3$ avoids a break in the transmission or tractive force through the train $T_1$ when changing from the first speed to the second speed, as will be explained hereinafter.

On the downstream side of the simple gear train $T_1$ is the double or composed gear train $T_2$. This gear train $T_2$ comprises (FIGS. 1 and 2) an upstream centre sun gear $a_2$ rotatively mounted on the sleeve K, and a downstream centre sun gear $a_3$ which is connected to rotate with the sleeve K on which it is keyed. The upstream gear $a_2$ is meshed with the planet gears $b_2$ mounted on a double planet gear carrier $d_2$. The latter carries, in addition to the single planet gear $b_2$, double planet gears $b_3$ whose tooth size allows them to mesh both with the gear $a_3$ and the planet gears $b_2$. The double planet gears $b_3$ mesh with the ring gear $c_3$ of the double gear train $T_2$. This ring gear is rigid with the driven shaft N of the gear box.

In the double gear train $T_2$ the upstream centre gear $a_2$ carries a brake ring 50 on which the brake band $F_2$ can be tightened under the action of the jack $V_2$. The planet gear carrier $d_2$ carries a ring 51 on which the brake band $F_3$ can be tightened under the action of the jack $V_3$.

The gear box operates in the following manner:

As is known, the hydraulic torque converter A transmits a torque exceeding the driving torque for low speeds and a torque equal to the driving torque (and, therefore, operates as a simple hydraulic coupling) for high speeds, namely after the vehicle has started up, owing to the action of the free wheel $R_2$ which releases the reactor 36 and allows it to rotate with the pump 34 and the turbine 35. With the engine operating, the torque converter is filled with oil under pressure and the latter is pumped through the conduit 8 and the conduit 16 by the gear pump B, the latter being driven in rotation by the driving shaft M. When the engine is operating, but with the vehicle stationary, the shaft M rotates but not the shafts L and N. The shaft M rotates the impeller or pump of the hydraulic converter 34 and the latter rotates the turbine 35 in bearing against the reactor 36 which is locked by the free wheel $R_2$. The turbine 35 rotates the sleeve J through the free wheel $R_1$ but no motion is transmitted to the epicyclic gear trains $T_1$ and $T_2$ nor to the driven shaft N since no clutch or brake element is actuated.

The following Table I shows the states of the various parts of the gear box for the various speeds.

TABLE I

| Speeds | Converter | Clutch | | | Brakes | | |
|---|---|---|---|---|---|---|---|
| | | $E_1$ | $E_2$ | $E_3$ | $F_1$ | $F_2$ | $F_3$ |
| O | | | | | | | |
| I | + | | | | + | + | |
| I | Locked | | + | | + | + | |
| II | + | | | + | | + | |
| II | Locked | | + | + | | + | |
| III | | + | | (+) | | + | |
| IV | Locked | + | + | + | | | |
| V | Locked | + | + | | + | | |
| $AR_1$ | + | | | | + | | + |
| $AR_2$ | + | | | + | | | + |

In this Table I, the engaged positions, namely the operative positions of the clutches $E_1$, $E_2$, $E_3$ and the brakes $F_1$, $F_2$ and $F_3$, are indicated by the sign +. The compartments which do not have the sign + correspond to the positions in which the clutch and brake elements are disengaged and therefore inoperative. The sign (+) signifies that a clutch or brake element can be engaged but this is optional and in any case the clutch or the brake in question plays no active part. The interest in maintaining this element engaged will be explained hereinafter.

The sign + in the compartments related to the converter signify that the converter fed with oil under pressure plays an active part.

The neutral and the various transmission ratios will now be examined.

*Neutral (O)*

The engine is operating. The vehicle is stationary. As no brake or clutch is engaged, the converter A rotates in an idling manner together with the ring gear $c_1$ of the gear train $T_1$ without driving the driven shaft N.

First speed (I) (FIG. 3)

This is the starting off speed. The turbine 35 of the converter A drives the ring gear $c_1$ of the gear train $T_1$ through the free wheel $R_1$. The planet gear carrier $d_1$ of the gear train $T_1$ is driven at a speed lower than that of the ring gear $c_1$ and the planet gears $b_1$ mesh with the gear $a_1$ which is held stationary both by the brake $F_1$ and the free wheel $R_3$. The motion is transmitted from the planet gear carrier $d_1$ to the sleeve K and the gear $a_3$ of the double gear train $T_2$. The motion is transmitted to the planet gears $b_3$ and $b_2$ and therefore to the planet gear carrier $d_2$ and consequently to the ring $c_3$ and the driven shaft N owing to the fact that the planet gears $b_2$ mesh with the gear $a_2$ which is held stationary.

This transmission can be termed a turbo-mechanical transmission since it employs the torque converter A.

However, if the vehicle driver engages the clutch $E_2$, he is employing a purely mechanical transmission and the converter A is bypassed, the latter being locked so that the motion is transmitted directly from the driving shaft M to the sleeve J.

The driver can engage the clutch $E_2$ and lock the converter after the vehicle has moved off and this affords the driver the advantage of being in a position to use the engine as a brake.

Second speed (II) (FIG. 4)

Employed as a turbo-mechanical transmission, the second speed is obtained through the converter A in the same way as the first speed. The gear train $T_1$ rotates as a unit, the transmission ratio afforded by the double gear train $T_2$ remains the same and the driven shaft N rotates at a higher speed. The free wheel $R_3$ permits engagement of the clutch $E_3$ without cutting off the fuel supply and thus affords comfort to the passengers when changing the speed. Owing to the fact that the free wheel $R_3$ allows the gear $a_1$ and the planet gear carrier $d_1$ to pass without interruption from the preceding low speed, in which the gear train $T_1$ is a speed reducer, to a higher speed equal to that of the sleeve J in which the gear train $T_1$ rotates as a unit, there is no break in the traction when changing from first to second speed. Consequently, the engine slows down without ceasing to propel the vehicle.

In the second speed, the driver can also engage the clutch $E_2$ so as to lock the converter A in which case he can benefit from the braking effect of the engine.

Third speed (III) (FIG. 5)

The motion is transmitted directly from the driving shaft M to the intermediate shaft L and the composite gear train $T_2$. The gear train $T_1$ can rotate if the clutch $E_3$ is engaged but it performs no function. There is no break in the traction when passing from the second to the third speed since the double gear train $T_2$ operates under the same conditions as for the second speed but is driven a little more rapidly owing to the direct transmission of the movement to the planet gear carrier $d_2$. The absence of a break in the traction when passing from the second to the third speed is therefore achieved owing to the fact that the brake $F_2$ is engaged.

The clutch $E_3$ can remain engaged but it performs no function. The advantage in maintaining this clutch engaged is that it is in this way ready to come into action for the fourth speed and movement of the discs is avoided, which reduces wear. The engagement of the clutch $E_3$, therefore, ensures operational reliability of the gear box.

Fourth speed (IV) (FIG. 6)

This is the direct drive between the driving shaft M and the driven shaft N. The motion is transmitted directly to the composite gear train $T_2$ through the downstream gear $a_3$ and the planet gear carrier $d_2$ at the same speed as the driving shaft M, through the intermediate shaft L and the gear train $T_1$ rotating as a unit. Here again, notwithstanding the disengagement of the brake $F_2$, there is no break in the traction when passing from the third to the fourth speed since the clutch $E_1$ is engaged. The converter A is locked.

The braking action of the engine is available to the driver as for the third speed.

Fifth speed (V) (FIG. 7)

Without any break in the traction, since in the composite gear train $T_2$ the same elements as in the fourth speed are driven, this train $T_2$ becomes a gearing-up gear train. The double planet gears $b_3$ mesh with and roll against the gear $a_3$. The latter is driven by the gear train $T_1$ at a certain reduced speed which is lower than that of the shaft M. The planet gear carrier $d_2$ rotates at the speed of the driving shaft M. The resulting speed of the ring gear $c_3$ and consequently of the shaft N is obtained in composing said speed of the driving shaft M. The speed of the shaft N is therefore higher than the speed of the driving shaft M.

With the converter A locked, as in the case of the clutch $E_2$ for the fourth speed, the braking action of the engine is available.

First reverse speed ($AR_1$) (FIG. 8)

As in moving off in the first speed, the motion is transmitted through the converter. It is transmitted through the free wheel $R_1$ to the ring gear $c_1$ of the gear train $T_1$ which drives the planet gear carrier $d_1$ whose planet gears $b_1$ mesh with the sun gear $a_1$ which is held stationary. Reversal of the direction of rotation of the shaft N is achieved by holding the planet gear carrier $d_2$ stationary. At the same time, the fact of holding this carrier stationary reduces the speed between the sun gear $a_3$ and the ring gear $c_3$.

Second reverse speed ($AR_2$) (FIG. 9)

As in the first reverse speed, the converter A is operative and the planet gear carrier $d_2$ of the double gear train $T_2$ is held stationary. However, instead of being a gearing-down train the train $T_1$ rotates as a unit. Consequently, the movement is transmitted to the shaft N at a speed higher than that of the first reverse speed.

The main advantages of the mechanism according to the invention are as follows:

As has been seen hereinbefore, the braking action of the engine can be made available for all the transmission ratios of forward speeds owing to the clutch $E_2$ for the first and second speeds, the brake $F_2$ for the third speed, the clutch $E_2$ once again for the fourth speed and the brake $F_1$ for the fifth speed.

The converter A is employed for the low speeds, namely the first and second speeds, and reverse speed, and this affords great flexibility in moving off and a good acceleration. However, the converter can be locked by the clutch $E_2$ which makes available the braking action of the engine, even at the low forward speeds.

There is no break in the transmission of the tractive force when passing from the first to the second speed owing to the fact that the brake $F_2$ is maintained engaged which has for result that the same elements of the double gear train $T_2$ are operative. For similar reasons, there is no break in the transmission of the tractive force when changing from the second to the third speed (brake $F_2$ maintained engaged) and from the third to the fourth speed (clutch $E_1$ maintained engaged).

In other words, a smooth changing of speeds is achieved by maintaining a clutch or a brake engage for two consecutive speeds.

As concerns the second speed employing a mechanical transmission (FIG. 4) with the clutch $E_2$ engaged, the free wheel $R_1$ avoids an emptying of the converter A. Indeed, in allowing the sleeve J to rotate freely relative to the turbine 35 which is inoperative, the free wheel $R_1$ ensures that the converter A does not play the disadvantageous part of a hydraulic brake. Without the free wheel $R_1$ it would be necessary to empty the converter which is a rather rapid operation but it would be thereafter necessary to fill it once again to make it subsequently available. Now, this filling takes a long time.

Further, the upper speeds, namely the third, fourth and fifth speeds, are purely mechanical transmissions so that the power of the engine is transmitted from the shaft M to the shaft N at excellent efficiency.

Apart from these advantages, it should be noted that the combination according to the invention of a torque converter, a single epicyclic gear train, a composite epicyclic gear train having two sets of planet gears, three brakes, three clutches and three free wheels, affords five forward speeds and two reverse speeds within a minimum overall size. This combination, and more particularly the operative connection of the turbine 35 of the converter A to the gear $a_3$ of the gear train $T_2$, consisting of the free wheel $R_1$, the hollow shaft J, the gear train $T_1$ and the hollow shaft K, affords all the aforementioned speed combinations and still further combinations if modifications are effected. This operative connection according to the invention therefore has numerous possibilities applicable to different types of automobile vehicles, such as touring cars, trucks and motor coaches, tractors and light railway motor tractors.

Having now described my invention, that which I claim as new and desire to secure by Letters Patent is:

1. A change-speed mechanism for an automobile vehicle, said mechanism comprising an input shaft; an output shaft; an intermediate shaft interposed between said input and output shafts; said input and output shafts being coaxial; a torque converter having a pump and a turbine, said pump being connected to be driven by said input shaft; a first epicyclic gear train comprising a planet gear carrier, two sets of planet gears on said carrier, two sun gears one of which is an upstream sun gear and the other a downstream sun gear, each of said sun gears meshing with one of said sets of planet gears and a single ring gear connected to said output shaft and meshing with one of said sets of planet gears; and means for operatively connecting said turbine for a single direction of rotation thereof to said downstream sun gear of said first epicyclic gear train, said means comprising a first hollow shaft which is rotatably mounted on said intermediate shaft, a free wheel for connecting said hollow shaft to said turbine, a second hollow shaft which is also rotatably mounted on said intermediate shaft and to which said downstream sun gear of said first epicyclic gear train is directly connected so as to rotate therewith, at least one second epicyclic gear train for interconnecting said hollow shafts, and brakes and clutches combined with said gear trains and torque converter.

2. A mechanism as claimed in claim 1, wherein said second epicyclic gear train comprises a ring gear connected to rotate with said first hollow shaft which is connected to rotate with said turbine through said free wheel, said second epicyclic gear train having a planet gear carrier connected to said second hollow shaft which carries said downstream sun gear of the first epicyclic gear train.

3. A mechanism as claimed in claim 2, comprising a case, a brake, a clutch and second free wheel which bears against said case, said second epicyclic gear train having a sun gear connected to said brake and to said second free wheel and being capable of being rigidly connected to said ring gear of said second gear train by said clutch.

4. A mechanism as claimed in claim 1, comprising a clutch for connecting the intermediate shaft to the input shaft, said intermediate shaft being directly connected to said planet gear carrier of said first epicyclic gear train.

5. A mechanism as claimed in claim 1, comprising a clutch disposed between said hollow shaft and said input shaft, said clutch being capable of locking said converter, that is, replacing the hydraulic connection afforded by said converter between said input shaft and one of said epicyclic gear trains by a direct mechanical connection through said clutch.

References Cited

UNITED STATES PATENTS

| 3,292,455 | 12/1966 | Welch | 74—688 |
| 3,308,687 | 3/1967 | Borman | 74—688 |
| 3,314,307 | 4/1967 | Egbert | 74—688 |

FOREIGN PATENTS 632,074  12/1961  Canada.

MARTIN P. SCHWADRON, *Primary Examiner.*

ALLAN D. HERRMANN, *Assistant Examiner.*

U.S. Cl. X.R.

74—763